US012718434B2

(12) United States Patent
Daultani et al.

(10) Patent No.: US 12,718,434 B2
(45) Date of Patent: Aug. 25, 2026

(54) INFORMATION PROCESSING APPARATUS AND METHOD

(71) Applicant: RAKUTEN GROUP, INC., Tokyo (JP)

(72) Inventors: Dinesh Daultani, Madhya Pradesh (IN); Mitsuru Nakazawa, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 449 days.

(21) Appl. No.: 18/013,169

(22) PCT Filed: Dec. 27, 2021

(86) PCT No.: PCT/JP2021/048569

§ 371 (c)(1),
(2) Date: Dec. 27, 2022

(87) PCT Pub. No.: WO2023/127018

PCT Pub. Date: Jul. 6, 2023

(65) Prior Publication Data

US 2024/0135685 A1 Apr. 25, 2024

(51) Int. Cl.
*G06V 10/774* (2022.01)
*G06T 5/20* (2006.01)
(Continued)

(52) U.S. Cl.
CPC .............. *G06V 10/774* (2022.01); *G06T 5/20* (2013.01); *G06T 5/60* (2024.01); *G06T 5/92* (2024.01);
(Continued)

(58) Field of Classification Search
None
See application file for complete search history.

(56) References Cited

U.S. PATENT DOCUMENTS 10,803,352 B2 * 10/2020 Yamada ................ G06F 18/214
11,189,375 B1 * 11/2021 O'Connor ............. G16H 30/40
(Continued)

FOREIGN PATENT DOCUMENTS

CN 109377479 * 2/2019
CN 109443359 A 3/2019
(Continued)

OTHER PUBLICATIONS

Zoph et al. ("Learning Data Augmentation Strategies for Object Detection", arXiv:1906.11172v1 [cs.CV] Jun. 26, 2019) (Year: 2019).*

(Continued)

*Primary Examiner* — Randolph I Chu
(74) *Attorney, Agent, or Firm* — Sughrue Mion, PLLC

(57) ABSTRACT

[Problem] Provided is a novel information processing technology relating to a predetermined object in an image. [Solving Means] An information processing apparatus includes: an image acquisition unit that acquires an image used as teacher data for machine learning, the image being with one or a plurality of annotations for showing a position in the image at which a predetermined object is shown; an adjustment image generation unit that generates an adjustment image in which parameters of the image are adjusted; and a machine learning unit that generates a learning model for detecting the predetermined object in an image by performing machine learning using teacher data including the adjustment image.

16 Claims, 13 Drawing Sheets

(51) Int. Cl.

| | |
|---|---|
| ***G06T 5/60*** | (2024.01) |
| ***G06T 5/92*** | (2024.01) |
| ***G06T 7/11*** | (2017.01) |
| ***G06T 7/194*** | (2017.01) |
| ***G06T 7/80*** | (2017.01) |
| ***G06T 11/60*** | (2006.01) |

(52) U.S. Cl.

CPC ................ *G06T 7/11* (2017.01); *G06T 7/194* (2017.01); *G06T 7/80* (2017.01); *G06T 11/60* (2013.01); *G06T 2207/20081* (2013.01)

(56) References Cited

U.S. PATENT DOCUMENTS

| | | | | |
|---|---|---|---|---|
| 11,276,194 | B2 * | 3/2022 | Tomochika | G06V 10/242 |
| 2010/0295855 | A1 | 11/2010 | Sasakawa et al. | |
| 2016/0216245 | A1 | 7/2016 | Sutton | |
| 2017/0077586 | A1 | 3/2017 | Li et al. | |
| 2017/0236258 | A1 | 8/2017 | Hsu et al. | |
| 2018/0068452 | A1 | 3/2018 | Ito et al. | |
| 2018/0205931 | A1 * | 7/2018 | Yano | H04N 13/128 |
| 2018/0343435 | A1 | 11/2018 | Mizuno | |
| 2019/0139225 | A1 | 5/2019 | Wang et al. | |
| 2019/0378254 | A1 | 12/2019 | Hsu et al. | |
| 2020/0151899 | A1 * | 5/2020 | Suzuki | G06N 3/045 |
| 2020/0320886 | A1 | 10/2020 | Zhou | |
| 2020/0380302 | A1 * | 12/2020 | Nakazawa | G06F 18/2148 |
| 2021/0012520 | A1 | 1/2021 | Zhou et al. | |
| 2021/0114748 | A1 | 4/2021 | Takahashi et al. | |
| 2021/0183032 | A1 | 6/2021 | Hsu et al. | |
| 2021/0233250 | A1 | 7/2021 | Wang et al. | |
| 2021/0362839 | A1 | 11/2021 | Nakazawa et al. | |
| 2022/0012895 | A1 | 1/2022 | Wakui | |
| 2023/0118460 | A1 * | 4/2023 | Liba | G06T 5/77 |
| 2023/0281850 | A1 | 9/2023 | Harmsen et al. | |
| 2024/0135685 | A1 * | 4/2024 | Daultani | G06T 7/11 |

FOREIGN PATENT DOCUMENTS

| | | | | | |
|---|---|---|---|---|---|
| CN | 110910349 | A | | 3/2020 | |
| CN | 112580683 | A | | 3/2021 | |
| CN | 109377479 | B | | 10/2021 | |
| JP | 2001-320621 | A | | 11/2001 | |
| JP | 2014-160405 | A | | 9/2014 | |
| JP | 6443700 | B2 | | 12/2018 | |
| JP | 2019-179188 | A | | 10/2019 | |
| JP | 2019-220163 | A | | 12/2019 | |
| JP | 2020-80022 | A | | 5/2020 | |
| JP | 2020-197833 | A | | 12/2020 | |
| JP | 2021-77921 | A | | 5/2021 | |
| JP | 6934116 | B1 | | 9/2021 | |
| JP | 7734233 | B2 | * | 9/2025 | G06T 11/60 |
| KR | 10-2022-0166689 | A | | 12/2022 | |
| WO | 2009/093587 | A1 | | 7/2009 | |
| WO | 2020/204051 | A1 | | 10/2020 | |

OTHER PUBLICATIONS

Jingru Yi et al., "Oriented Object Detection in Aerial Images with Box Boundary-Aware Vectors", WACV, 2021, Department of Computer Science, Rutgers University, pp. 2150-2159 (10 pages).

Neural Network Console. Improving the efficiency of annotation work using labeling tools (URL: https://youtu.be/PR_dTNrlspw?t=475), 3 pages.

International Search Report dated Apr. 5, 2022, issued in International Application No. PCT/JP2021/048570.

International Search Report dated Mar. 8, 2022, issued in International Application No. PCT/JP2021/048571.

United States Office Action dated Jun. 13, 2025 in U.S. Appl. No. 18/003,385.

United States Office Action dated Jun. 18, 2025 in U.S. Appl. No. 18/013,173.

* cited by examiner

INFORMATION PROCESSING APPARATUS AND METHOD

CROSS REFERENCE TO RELATED APPLICATIONS

This application is a National Stage of International Application No. PCT/JP2021/048569 filed Dec. 27, 2021.

TECHNICAL FIELD

The present disclosure relates to an image processing technology.

BACKGROUND ART

Conventionally, there has been proposed a technology to acquire an image acquired through photographing of an antenna and to map characteristic points included in the acquired image into a three-dimensional space coordinate system (see Patent Literature 1). Further, there has been proposed a technology to apply a box boundary having orientation to an object detected using a machine learning model thereby estimating orientation of the object (see Non Patent Literature 1).

CITATION LIST

Patent Literature

[PTL 1] Japanese Patent No. 6443700

Non Patent Literature

[NPL 1] Jingru Yi, et al., "Oriented Object Detection in Aerial Images with Box Boundary-Aware Vectors," WACV2021, p. 2150-2159

SUMMARY OF INVENTION

Technical Problem

Conventionally, various technologies have been proposed to perform processing relating to a predetermined object in an image but have had an issue in a processing load or processing accuracy.

In response to the above issue, the present disclosure has an object of providing a novel information processing technology relating to a predetermined object in an image.

Solution to Problem

An example of the present disclosure provides an information processing apparatus including: an image acquisition unit that acquires an image used as teacher data for machine learning, the image being with one or a plurality of annotations for showing a position in the image at which a predetermined object is shown; an adjustment image generation unit that generates an adjustment image in which parameters of the image are adjusted; and a machine learning unit that generates a learning model for detecting the predetermined object in an image by performing machine learning using teacher data including the adjustment image.

Further, an example of the present disclosure provides an information processing apparatus including: a processing object acquisition unit that acquires an image to be processed; an image acquisition unit that acquires an image with one or a plurality of annotations for showing a position in the image at which a predetermined object is shown; an object detection unit that detects, by using a learning model for detecting the predetermined object in an image, the predetermined object in the image to be processed, the learning model being generated by machine learning using teacher data including the image with the one or the plurality of annotations; and an angle calculation unit that calculates an angle of a detected object relative to a predetermined reference in the image to be processed.

The present disclosure can be grasped as an information processing apparatus, a system, a method performed by a computer, or a program performed by a computer. Further, the present disclosure can also be grasped as matters recorded in a recording medium readable by a computer, other apparatus, a machine, or the like, on which such a program is recorded. Here, a recording medium readable by a computer or the like refers to a recording medium that accumulates information, such as data and a program, through an electrical, magnetic, optical, mechanical, or chemical operation and can be read by a computer or the like.

Advantageous Effects of Invention

According to the present disclosure, it is possible to provide a novel information processing technology relating to a predetermined object in an image.

DESCRIPTION OF EMBODIMENTS

Figure 1:
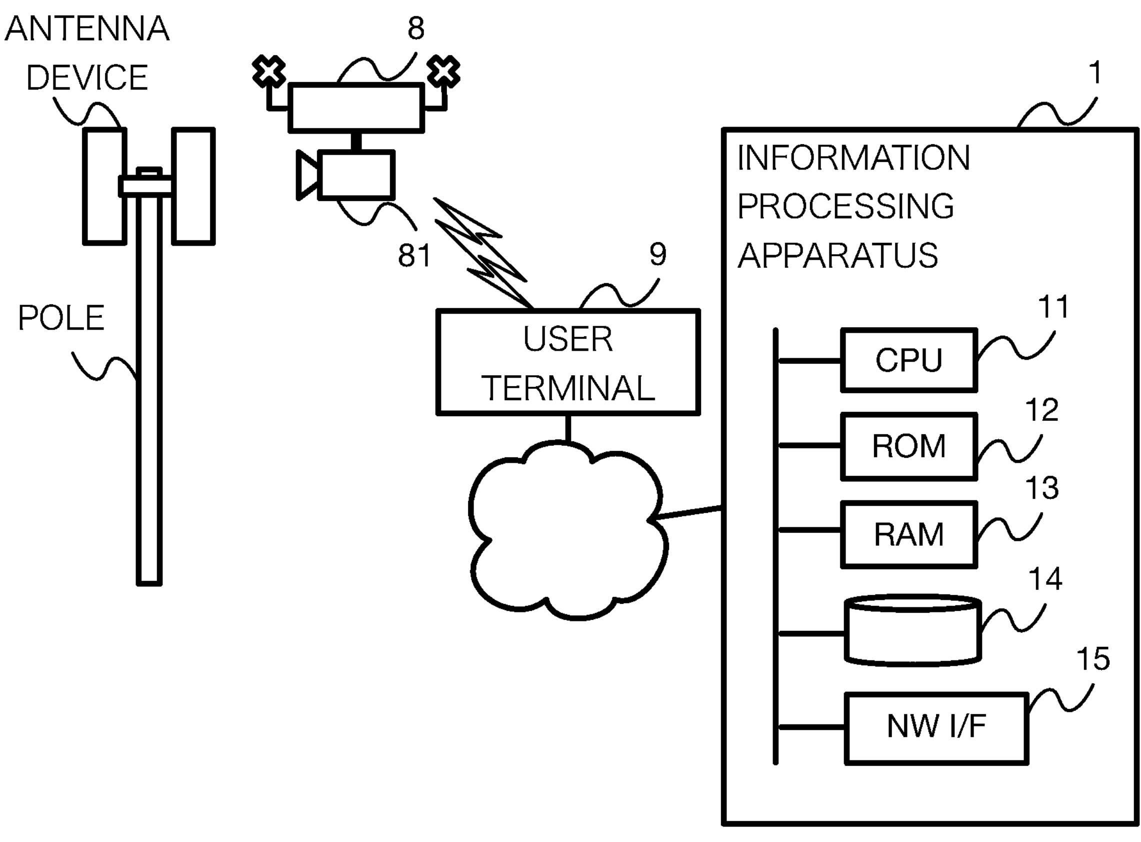
FIG. 1 is a schematic diagram showing the configuration of a system according to an embodiment.

Hereinafter, an embodiment of a system, an information processing apparatus, a method, and a program according to the present disclosure will be described on the basis of the drawings. However, the embodiment described below is example and will not limit the system, the information processing apparatus, the method, and the program according to the present disclosure to the following specific configurations. In implementation, specific configurations corresponding to a mode of implementation may be appropriately employed, and various modifications or deformations may be performed.

The present embodiment will describe a case in which a technology according to the present disclosure is implemented for a system that confirms the installation state of an antenna device of a mobile base station using an image aerially photographed using a drone. However, the technology according to the present disclosure is widely usable for a technology to detect a predetermined object in an image, and an object to which the present disclosure applies is not limited to an example shown in the embodiment.

In recent years, as the number of downsized mobile communication base stations increases, the importance of a technology to monitor whether the angles of antenna devices constituting the base stations are in a required state is rising. Here, processing to map the characteristic points of antenna devices in photographed images on a space or the like has been conventionally proposed. However, there is a possibility that characteristic points cannot be satisfactorily extracted due to the substantial assimilation between antenna devices and an outdoor background or the like during photographing under the conventional technology.

In view of such circumstances, the system, the information processing apparatus, the method, and the program according to the present embodiment expand the learning data of a learning model that detects the antenna devices by generating an image group in which annotations showing the places of regions corresponding to antenna devices are commonly made and in which different parameter adjustments are made.

Further, a technology to detect line characteristics in images has been proposed, and a technology by which positions desired to be labeled are estimated and corrected according to surrounding data when accurate coordinates are not input but appropriate coordinates are clicked has been proposed. These technologies enable the assistance of labeling or annotations through the detection of edges or lines in images that are subjected to the labeling or annotations but have had room for improvement in that local annotations made by a manual operation are corrected and annotation assistance is performed with high efficiency.

In view of such circumstances, the system, the information processing apparatus, the method, and the program according to the present embodiment correct the positions of annotations made on images by a manual operation or automatically on the basis of the edge detection results of the images as assistance for the annotations showing the places of the regions of antenna devices made on drone aerial images of the antenna devices.

<System Configuration>

FIG. 1 is a schematic diagram showing the configuration of the system according to the present embodiment. The system according to the present embodiment includes an information processing apparatus 1, a drone 8, and a user terminal 9 that are communicable with each other when connected to a network.

The information processing apparatus 1 is a computer including a CPU (Central Processing Unit) 11, a ROM (Read Only Memory) 12, a RAM (Random Access Memory) 13, a storage device 14 such as an EEPROM (Electrically Erasable and Programmable Read Only Memory) or a HDD (Hard Disk Drive), a communication unit 15 such as a NIC (Network Interface Card), or the like. However, appropriate omission, replacement, or addition is possible in the specific hardware configuration of the information processing apparatus 1 according to a mode of implementation. Further, the information processing apparatus 1 is not limited to an apparatus composed of a single housing. The information processing apparatus 1 may be realized by a plurality of apparatuses using a so-called cloud technology, a distributed computing technology, or the like.

The drone 8 is a small unmanned airplane of which the flight is controlled according to an input signal from an outside and/or a program recorded on a device and includes a propeller, a motor, a CPU, a ROM, a RAM, a storage device, a communication unit, an input device, an output device, or the like (not shown). However, appropriate omission, replacement, or addition is possible in the specific hardware configuration of the drone 8 according to a mode of implementation. Further, the drone 8 according to the present embodiment includes an imaging device 81 and captures an image of an object according to an input signal from an outside and/or a program recorded on the device when flying around the predetermined object (an antenna device in the present embodiment). In the present embodiment, a captured image is acquired to mainly confirm the orientation of an antenna among the installation states of an antenna device of a mobile base station. Therefore, the drone 8 and the imaging device 81 are controlled to take such a position and a posture as to be able to capture an image of the antenna device from immediately above the antenna device and capture an image to acquire an image (a so-called top view) of the antenna device seen from its immediate above side. Further, the drone 8 and the imaging device 81 are controlled to take such a position and a posture as to be able to capture an image of the antenna device from right beside the antenna device and capture an image to acquire an image (a so-called side view) of the antenna device seen from its right beside. Note that the imaging device 81 may be a camera including an image sensor or may be a depth camera including a ToF (Time of Flight) sensor or the like.

Further, the data of an image acquired by imaging may include, as meta data, data output from various devices mounted on the drone 8 or the imaging device 81 when the image is captured. Here, examples of the various devices mounted on the drone 8 or the imaging device 81 include a three-axis acceleration sensor, a three-axis angular velocity sensor, a GPS (Global Positioning System) device, and a direction sensor (compass), or the like. Further, the data output from the various devices may include, for example, the accelerations of respective axes, the angular velocities of respective axes, positional information, compass direction, or the like. As a method for adding such meta data to image data, an EXIF (exchangeable image file format) has been known. However, a specific method for adding meta data to image data is not limited.

The user terminal 9 is a terminal device used by a user. The user terminal 9 is a computer including a CPU, a ROM, a RAM, a storage device, a communication unit, an input device, an output device, or the like (not shown). However, appropriate omission, replacement, or addition is possible in the specific hardware configuration of the user terminal 9 according to a mode of implementation. Further, the user terminal 9 is not limited to a device composed of a single housing. The user terminal 9 may be realized by a plurality of devices using a so-called cloud technology, a distributed computing technology, or the like. Via the user terminal 9, the user performs the generation of teacher data by making annotations on an image, the transfer of an image captured by the drone 8 to the information processing apparatus 1, or the like. Note that annotation in the present embodiment refers not only to the act of making annotations but also to one or more points (key points), labels, or the like added to an image by the annotation.

Figure 2:
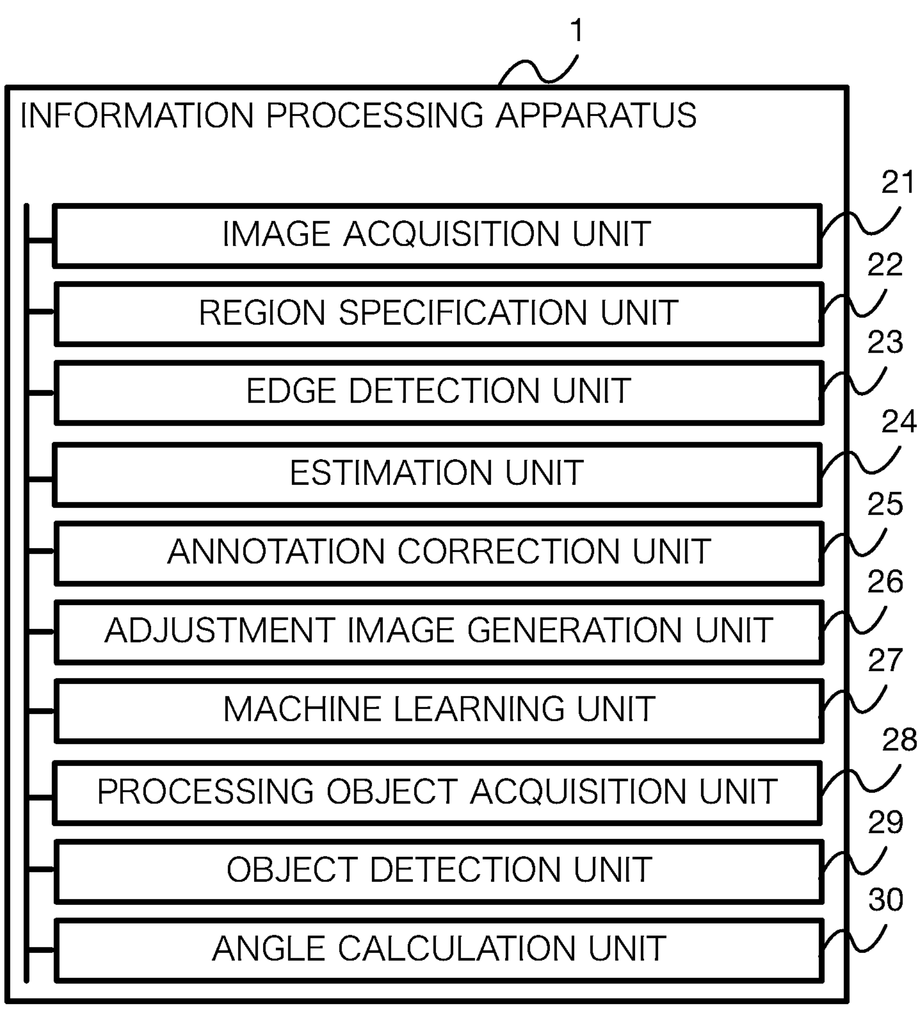
FIG. 2 is a diagram showing the outline of the functional configuration of an information processing apparatus according to the embodiment.

FIG. 2 is a diagram showing the outline of the functional configuration of the information processing apparatus 1 according to the present embodiment. The information processing apparatus 1 functions as, when a program recorded on the storage device 14 is read into the RAM 13 and run by the CPU 11 and the respective hardware provided in the information processing apparatus 1 is controlled, an information processing apparatus including an image acquisition unit 21, a region specification unit 22, an edge detection unit 23, an estimation unit 24, an annotation correction unit 25, an adjustment image generation unit 26, a machine learning unit 27, a processing object acquisition unit 28, an object detection unit 29, and an angle calculation unit 30. Note that although respective functions provided in the information processing apparatus 1 are performed by the CPU 11 serving as a general-purpose processor in the present embodiment and other embodiments that will be described later, some or all of these functions may be performed by one or a plurality of dedicated processors.

The image acquisition unit 21 acquires an image used as teacher data for machine learning, the image being with one or a plurality of annotations for showing a position in the image at which a predetermined object (an antenna device in the present embodiment) is shown.

Figure 3:
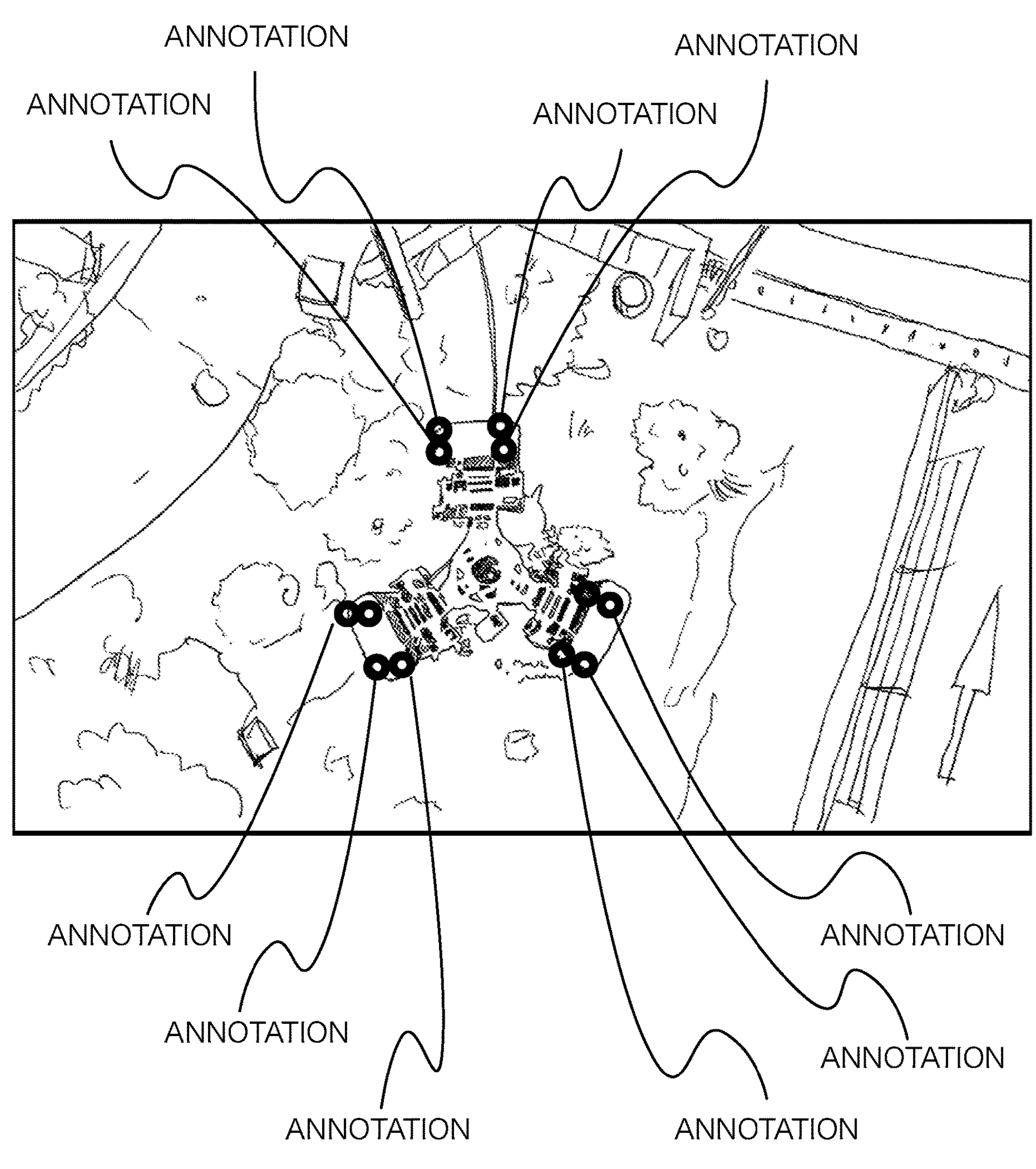
FIG. 3 is a diagram showing an example of an image on which annotations are made according to the embodiment.

FIG. 3 is a diagram showing an example of an image that is annotated and used as teacher data according to the present embodiment. In the present embodiment, teacher data is used to generate and/or update a learning model for detecting antenna devices for a mobile phone network installed in structures such as outdoor electric poles and steel towers from an image aerially photographed using the drone 8 that is in flight. Therefore, annotations for showing the positions of the antenna devices are made in advance on the image. In the example shown in FIG. 3, a plurality of points serving as annotations are made on the contours (in other words, the boundaries between antenna devices and a background) of three box-shaped members constituting the antenna devices in an image obtained by looking down from above (in a substantially vertical direction) and capturing an image of the antenna devices installed on the poles of a base station (the positions of the points are shown by circles in consideration of visibility in FIG. 3, but positions on which the annotations are made are the centers of the circles). Note that the present embodiment describes an example in which annotations are made as points showing positions in an image. However, the annotations can be any those which can show the region in the image where predetermined objects are captured, and the expression form of the annotations is not limited. The annotations may be, for example, straight lines, curved lines, graphics, fills or the like made on an image.

The region specification unit 22 specifies a region in which one or a plurality of annotations satisfy a predetermined criterion in an image. As a predetermined criterion, it is possible to use at least one or more of the density of annotations, the positions of annotations, the positional relationship between annotations, and/or the arrangement of annotations, and the like in an image. For example, the region specification unit 22 may specify a region in which the amount of annotations relative to area satisfies a predetermined criterion in an image. Further, for example, the region specification unit 22 may specify a region in which the positions of a plurality of annotations are in a predetermined relationship.

Figure 4:
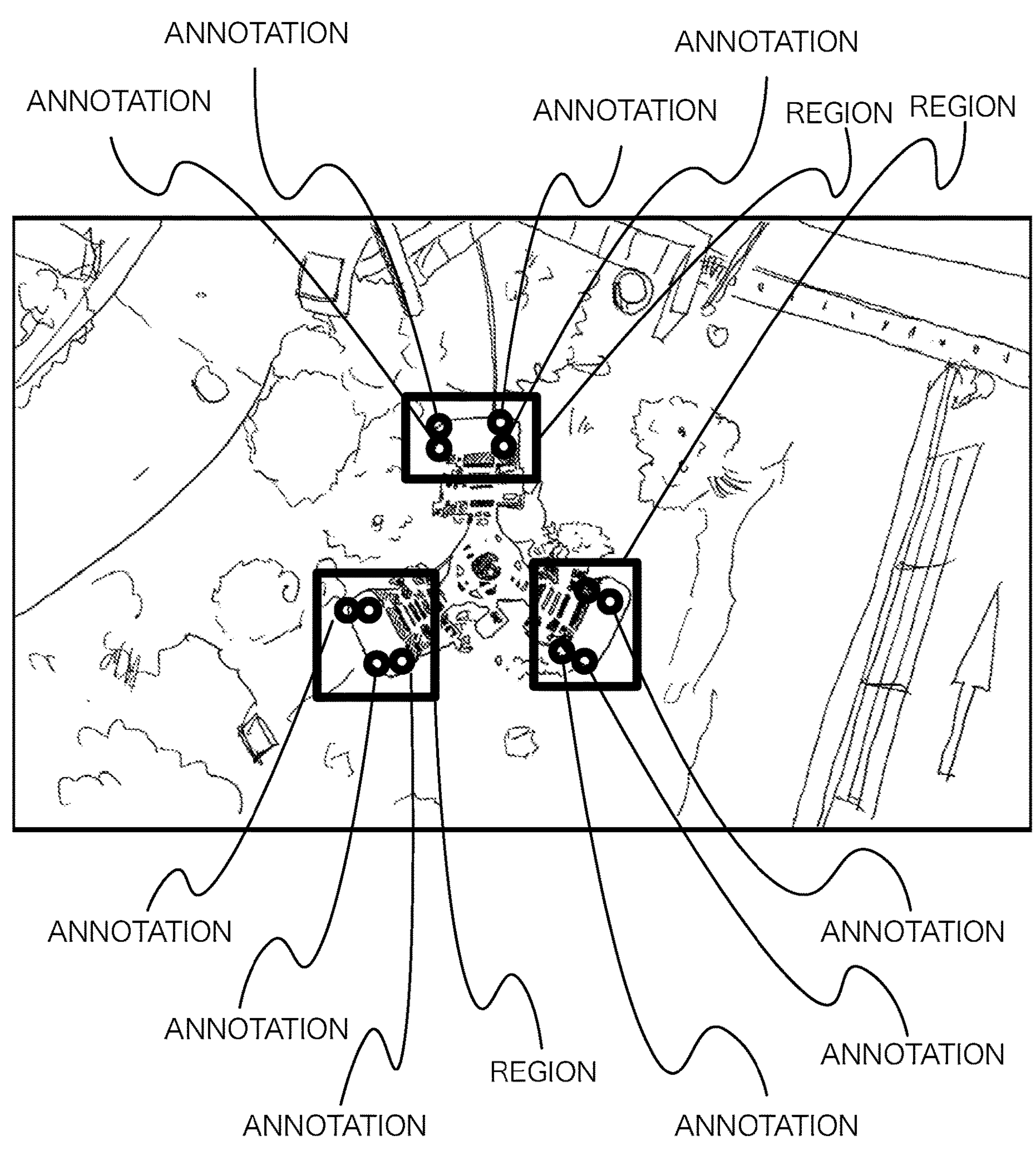
FIG. 4 is a diagram showing regions specified in an image in the embodiment.

FIG. 4 is a diagram showing specified regions in which a predetermined criterion is satisfied in an image in the present embodiment. It appears from an example shown in FIG. 4 that since regions in which one or a plurality of annotations satisfy a predetermined criterion rather than an entire image are specified, regions to be subjected to edge detection that will be described later are limited, and a processing load for the edge detection can be reduced compared with a case in which the edge detection is performed in the entire image. Here, a method for specifying the regions is not limited below, but a specific method for specifying the regions will be illustrated.

First, an example of a method for specifying a region in which the amount of annotations relative to area satisfies a predetermined criterion in an image will be described. For example, by calculating the center of gravity of a region formed by connecting annotations to each other and the area (for example, the number of pixels may be used as the area) in which the density of these annotations does not fall below predetermined density for each combination of some or all of the annotations in an image (a combination of four annotations adjacent to each other in the example shown in FIG. 4) and setting a region that includes the center of gravity as, for example, its center and has the area, the region specification unit 22 can specify a region in which the amount of the annotations relative to the area satisfies a predetermined criterion. Further, for example, by setting a circumscribed rectangle including these annotations for each combination of some or all of the annotations in an image and expanding the region of the rectangle vertically and horizontally until the density of the annotations calculated by the area of the rectangle and the number of the annotations reaches a predetermined threshold, the region specification unit 22 can specify a region in which the amount of the annotations relative to the area satisfies a predetermined criterion. However, the above illustrated methods are examples of methods for specifying a region, the region can be any one in which the amount of annotations relative to area satisfies a predetermined criterion, and other specific methods may be employed to specify the region.

Next, an example of a method for specifying a region in which the positions of a plurality of annotations are in a predetermined relationship will be described. For example, the region specification unit 22 specifies, for each combination of some or all of annotations in an image, the positional relationship between the annotations included in the combination. For example, each of the three box-shaped members constituting the antenna devices serving as predetermined objects according to the present embodiment has a substantially polygonal shape (a quadrangle in the example shown in FIG. 4) in which respective sides have a predetermined length relationship (ratio) in a plan view. Therefore, by determining, for each combination of annotations consisting of the same number of annotations as the number of vertices of the polygon (four in the example shown in FIG. 4), whether the annotations included in the combination have a positional relationship as the vertices of a preset substantial polygon in which respective sides have a predetermined length relationship (ratio), the region specification unit 22 can specify a predetermined region. Further, for example, by determining, for each combination of annotations, whether straight lines formed by the plurality of annotations are substantially parallel to each other or substantially orthogonal to each other, the region specification unit 22 may specify a predetermined region. However, the above illustrated methods are examples of methods for specifying a region, the region can be any one in which the positions of annotations relating to the region are in a predetermined relationship, and other specific methods may be employed to specify the region. Further, the present embodiment describes an example in which a rectangle region is specified. However, the shape of a region is not limited and may be, for example, a circle.

The edge detection unit 23 preferentially performs edge detection in a specified region or a range set on the basis of the region. That is, the edge detection unit 23 may use a region specified by the region specification unit 22 as it is, or may set a different range on the basis of the region (for example, the setting of a margin or the like) and use the range. Since an appropriate one of a conventional edge detection method and an edge detection method devised in the future may be selected and used as edge detection, its description will be omitted. The conventional edge detection method includes, for example, the gradient method, the Sobel method, the Laplacian method, the Canny method, or the like. However, an employable edge detection method or an employable filter is not limited.

The estimation unit 24 estimates, on the basis of a detected edge, a position at which an annotation was intended to be made. By referring to an edge detected around the position of an annotation, the estimation unit 24 estimates a position at which the annotation was intended to be made. More specifically, for example, the estimation unit 24 may estimate a position closest to an annotation among edges detected inside a region as a position at which the annotation was intended to be made. Further, for example, the estimation unit 24 may estimate a position having a predetermined characteristic among edges detected inside a region as a position at which an annotation was intended to be made. Here, as a position having a predetermined characteristic, a position at which edge lines cross each other, a position at which edge lines form an angle, or a position at which edge lines have a predetermined shape, or the like is illustrated.

The annotation correction unit 25 corrects, by moving the position of an annotation to a position estimated by the estimation unit 24, the annotation so as to be along a detected edge. As described above, a position estimated by the estimation unit 24 is, for example, a position closest to an annotation, a position at which edge lines cross each other, a position at which edge lines form an angle, a position at which edge lines have a predetermined shape, or the like among edges detected inside a region. In this manner, it is possible to correct the position of an annotation into the contour of a predetermined object in an image, the contour being assumed to be intended by an annotator (in other words, a boundary with a background).

Figure 5:
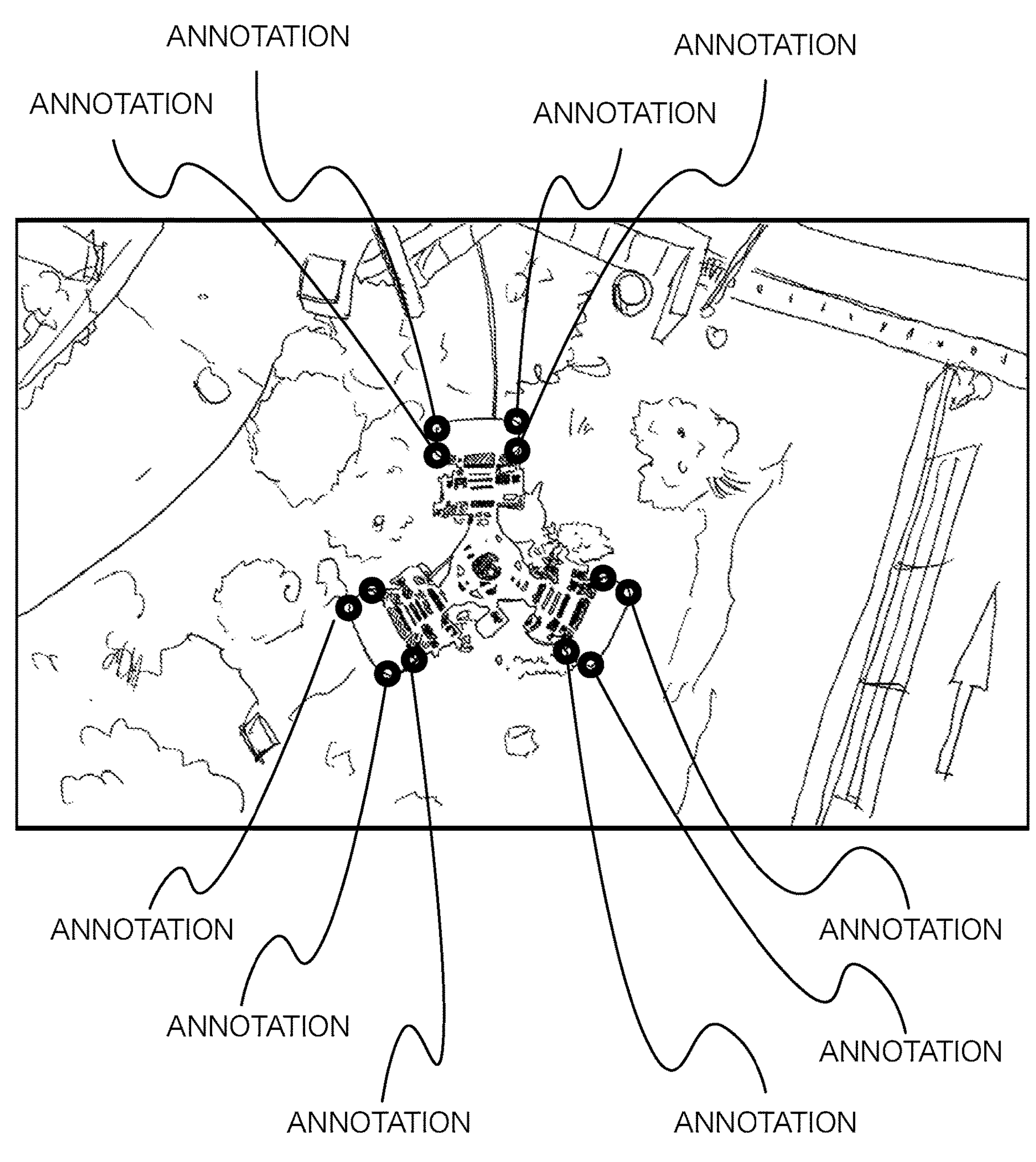
FIG. 5 is a diagram showing an example of an image in which annotations are corrected in the embodiment.

FIG. 5 is a diagram showing an example of an image in which annotations are corrected in the present embodiment. It appears from the example shown in FIG. 5 that the positions of annotations made at positions deviated from edges in FIG. 3 are corrected and the annotations are correctly made at the contours (in other words, boundaries with a background) of predetermined objects (antenna devices in the present embodiment).

The adjustment image generation unit 26 generates an adjustment image in which the parameters of an image are adjusted. Here, the adjustment image generation unit 26 generates an adjustment image in which the parameters of an image are adjusted to make a predetermined object hardly detected. An adjustment method for making a predetermined object hardly detected includes, for example, adjustment to make pixels capturing a predetermined object (an antenna device in the present embodiment) and pixels capturing a background (for example, a ground, a building, a plant, a structure on the ground, or the like) of the predetermined object become close to each other or the same in the parameters of the respective pixels (in other words, adjustment to make the color of the predetermined object become a protective color of a background color). Here, the adjustment image generation unit 26 may generate an adjustment image in which a parameter relating to at least any of the brightness of an image, exposure, white balance, hue, chroma, lightness, sharpness, noise, contrast, or the like among the parameters of the image is adjusted.

Further, the adjustment image generation unit 26 may generate a plurality of adjustment images that differ from each other on the basis of one image. That is, the adjustment image generation unit 26 may generate a first adjustment image in which the parameters of an image are adjusted and a second adjustment image in which the parameters of the image are adjusted so as to be made different from those of the first adjustment image. On this occasion, a plurality of generated adjustment images may include adjustment images in which the same types of parameters are adjusted by different degrees and/or adjustment images in which different types of parameters are adjusted. Note that a plurality of the same annotations may be made on the plurality of adjustment images. The annotations may be annotations corrected through the edge detection of the one image or annotations corrected through the edge detection of any adjustment image. The edge detection unit 23 may perform the edge detection of an adjustment image generated by the adjustment image generation unit 26. The estimation unit 24 may estimate a position closest to an annotation among edges detected in an adjustment image as a position at which the annotation was intended to be made. Here, when edge lines exhibit characteristics such as a predetermined positional relationship or the like in an adjustment image generated by the adjustment image generation unit 26, the estimation unit 24 may estimate a position closest to an annotation among edges detected in the adjustment image as a position at which the annotation was intended to be made.

The machine learning unit 27 generates, by performing machine learning using teacher data including an image corrected by the annotation correction unit 25 and/or an adjustment image, a learning model for detecting a predetermined object in an image. For example, the present embodiment illustrates the generation of a learning model for detecting a predetermined object in an image by supervised machine learning using a PyTorch library as will be illustrated in the angle calculation unit 30 below (see NPL 1). However, since an appropriate one of a conventional machine learning algorithm and a machine learning algorithm devised in the future may be selected and used as machine learning, its description will be omitted.

Here, an image used as teacher data by the machine learning unit 27 can be any image on which one or a plurality of annotations for showing a position in the image at which a predetermined object is shown are made, and the type of an image used as teacher data is not limited. The machine learning unit 27 can use as teacher data an intact image acquired by the image acquisition unit 21, an image corrected by the annotation correction unit 25, an adjustment image generated by the adjustment image generation unit 26, an adjustment image generated by the adjustment image generation unit 26 on the basis of an image corrected by the annotation correction unit 25, or the like. Further, as described above, teacher data including a plurality of adjustment images different from each other generated on the basis of one image, that is, a first adjustment image and a second adjustment image, may be used as an adjustment image. Note that a plurality of the same annotations may be made on each of an image and an adjustment image used as teacher data.

The processing object acquisition unit 28 acquires an image to be processed. In the present embodiment, an image to be processed is an image aerially photographed using the imaging device 81 mounted on the drone 8 that is in flight. However, an image to be processed can be any image in which a predetermined object in the image is desired to be detected, and may be an RGB image or a depth image. The type of an image to be processed is not limited.

The object detection unit 29 detects, using a learning model for detecting a predetermined object in an image generated by the machine learning unit 27, a predetermined object in an image to be processed. In the present embodiment, the object detection unit 29 detects an antenna device installed outdoors as a predetermined object in an image to be processed. However, the object detection unit 29 is allowed to detect various objects from an image according to an image used as teacher data and an object on which an annotation is made, and the type of a predetermined object detected using the technology according to the present disclosure is not limited. Further, a detected predetermined object is generally specified in the same method as that for an annotation made on teacher data. That is, when an annotation is a point showing the contour of a predetermined object, the object detection unit 29 specifies a predetermined object in an image to be processed, by adding a point to the contour of the predetermined object. However, a method for specifying a predetermined object is not limited, and the predetermined object may be specified in a method different from that for an annotation.

The angle calculation unit 30 calculates the angle of a detected object relative to a predetermined criterion in an image to be processed. More specifically, in the present embodiment, the angle calculation unit 30 calculates the angle of a detected object relative to any of a predetermined compass direction, a vertical direction, and a horizontal direction in an image to be processed. Here, a method for calculating an angle by the angle calculation unit 30 is not limited, but a method for detecting the orientation of an object using, for example, a method such as detection (see NPL 1) by a machine learning model and detection by a comparison with a previously-defined object shape and calculating an angle formed by the detected orientation of the object and a reference direction in an image to be processed may be employed.

<Flow of Processing>

Next, the flow of processing performed by the information processing apparatus 1 according to the present embodiment will be described. Note that the specific content and the processing order of the following processing are an example for carrying out the present disclosure. The specific processing content and the processing order may be appropriately selected according to the embodiment of the present disclosure.

Before performing the following annotation correction processing, the data expansion processing, and the machine learning processing, a user prepares in advance teacher data including an image on which annotations are made. Since the present embodiment uses the technology according to the present disclosure in a system that aims to detect antenna devices installed outdoors as predetermined objects, the user acquires a plurality of images including an image in which the antenna devices are reflected. Note that the plurality of images may include an image in which the antenna devices are not reflected. Then, the user generates teacher data by making annotations showing the contours of the antenna devices on the plurality of acquired images. On this occasion, the operation of making the annotations on the images may be manually performed by an annotator or may be performed automatically. Since a conventional annotation assisting technology may be employed, the description of the details of processing to make the annotations on the images will be omitted.

Figure 6:
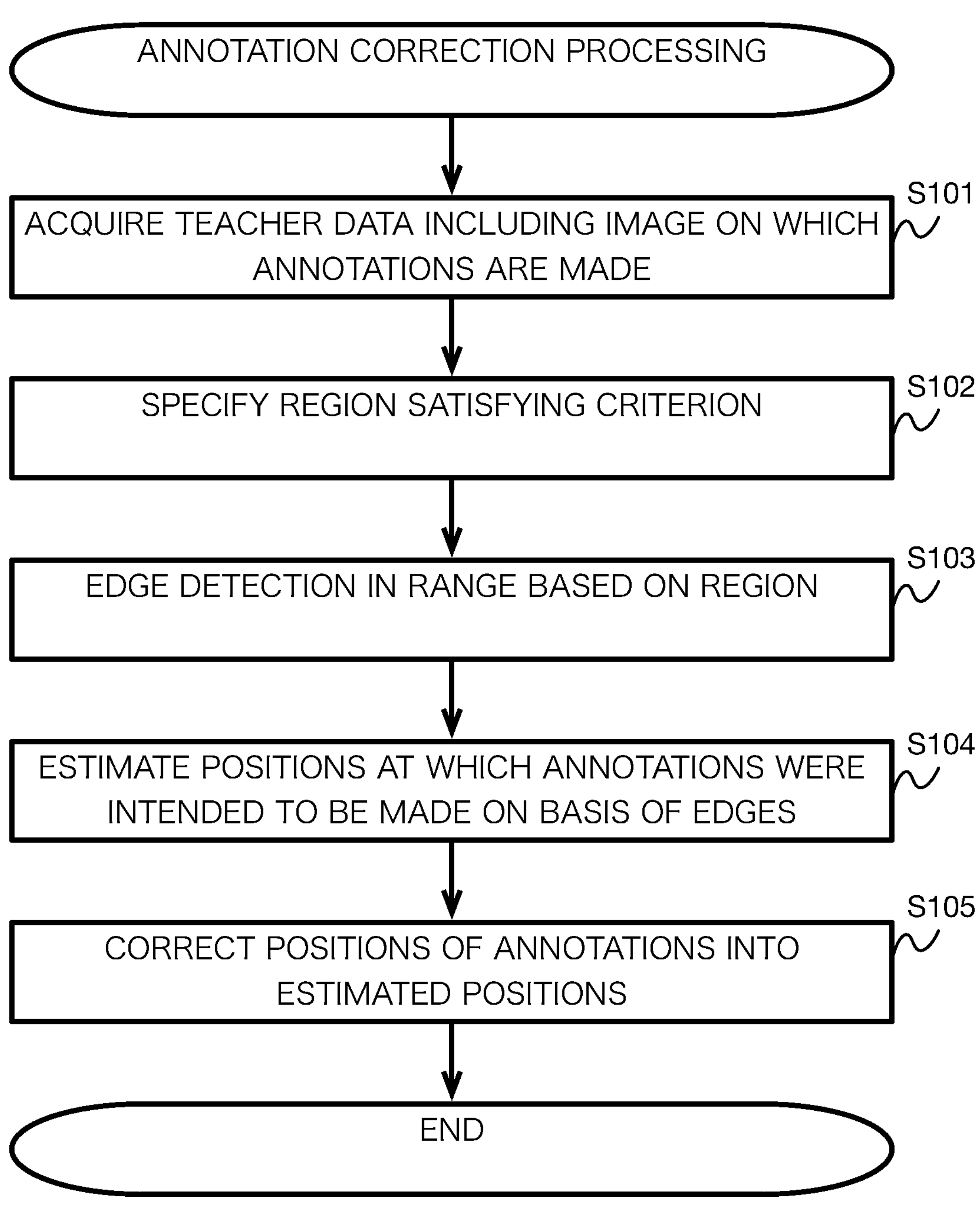
FIG. 6 is a flowchart showing the flow of annotation correction processing according to the embodiment.

FIG. 6 is a flowchart showing the flow of the annotation correction processing according to the present embodiment. The processing shown in this flowchart is performed when teacher data including an image on which annotations are made is prepared and instructions to perform annotation correction are provided by a user.

In step S101, teacher data including an image on which annotations are made is acquired. The image acquisition unit 21 acquires as teacher data an image on which one or a plurality of annotations for showing a position at which a predetermined object (an antenna device in the present embodiment) in an image is shown are made. After that, the processing proceeds to step S102.

In steps S102 and S103, a region in which one or a plurality of annotations satisfy a predetermined criterion is specified, and edges are detected in the specified region or the like. The region specification unit 22 specifies a region in which the one or the plurality of annotations satisfy a predetermined criterion in the image of the teacher data acquired in step S101 (step S102). Then, the edge detection unit 23 performs edge detection in the region specified in step S102 or a range set on the basis of the region (step S103). After that, the processing proceeds to step S104.

In steps S104 and S105, annotations are corrected so as to be along detected edges. The estimation unit 24 estimates, on the basis of edges detected in step S103, positions at which the annotations were intended to be made (step S104). Then, the annotation correction unit 25 corrects the annotations so as to be along the detected edges by moving the positions of the annotations to the positions estimated in step S104 (step S105). After that, the processing shown in this flowchart ends.

According to the above annotation correction processing, it is possible to improve the efficiency of processing to correct annotations made on an image used as teacher data for machine learning and correct the annotations with a smaller processing load over conventional art.

Figure 7:
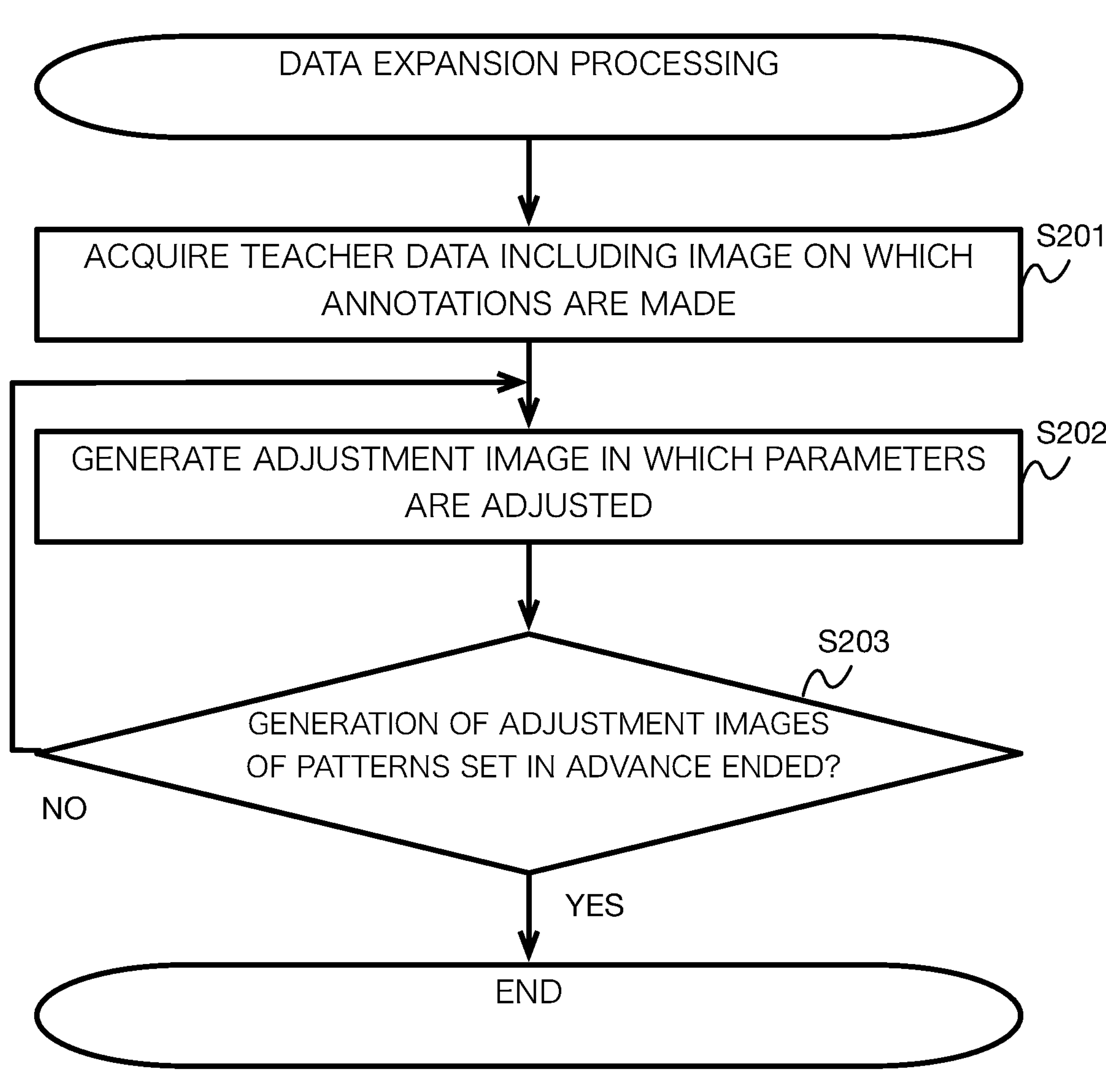
FIG. 7 is a flowchart showing the flow of data expansion processing according to the embodiment.

FIG. 7 is a flowchart showing the flow of the data expansion processing according to the present embodiment. The processing shown in this flowchart is performed when teacher data including an image on which annotations are made is prepared and instructions to perform data expansion are provided by a user.

In step S201, teacher data including an image on which annotations are made is acquired. The image acquisition unit 21 acquires as teacher data an image on which one or a plurality of annotations for showing a position at which a predetermined object (an antenna device in the present embodiment) in an image is shown are made. Note that the image acquired here on which the annotations are made is preferably an image that has been subjected to annotation correction by the annotation correction processing described with reference to FIG. 6, but an image that has not been subjected to the annotation correction may be acquired. After that, the processing proceeds to step S202.

In steps S202 and S203, one or a plurality of adjustment images are generated. The adjustment image generation unit 26 generates an adjustment image in which the parameters of the image acquired in step S201 are adjusted (step S202). When the adjustment image is generated, a determination is made as to whether the generation of the adjustment images of all patterns set in advance for the image acquired in step S201 has ended (step S203). When the generation has not ended (NO in step S203), the processing returns to step S202. That is, the adjustment image generation unit 26 repeatedly performs the processing of step S202 while changing the content of parameter adjustment on the basis of the one image acquired in step S201 to generate a plurality of different adjustment images. When the generation of the adjustment images of all the patterns set in advance has ended (YES in step S203), the processing shown in this flowchart ends.

According to the above data expansion processing, it is possible to reduce time and effort for improving the performance of a learning model generated by machine learning using an image on which annotations are made.

Figure 8:
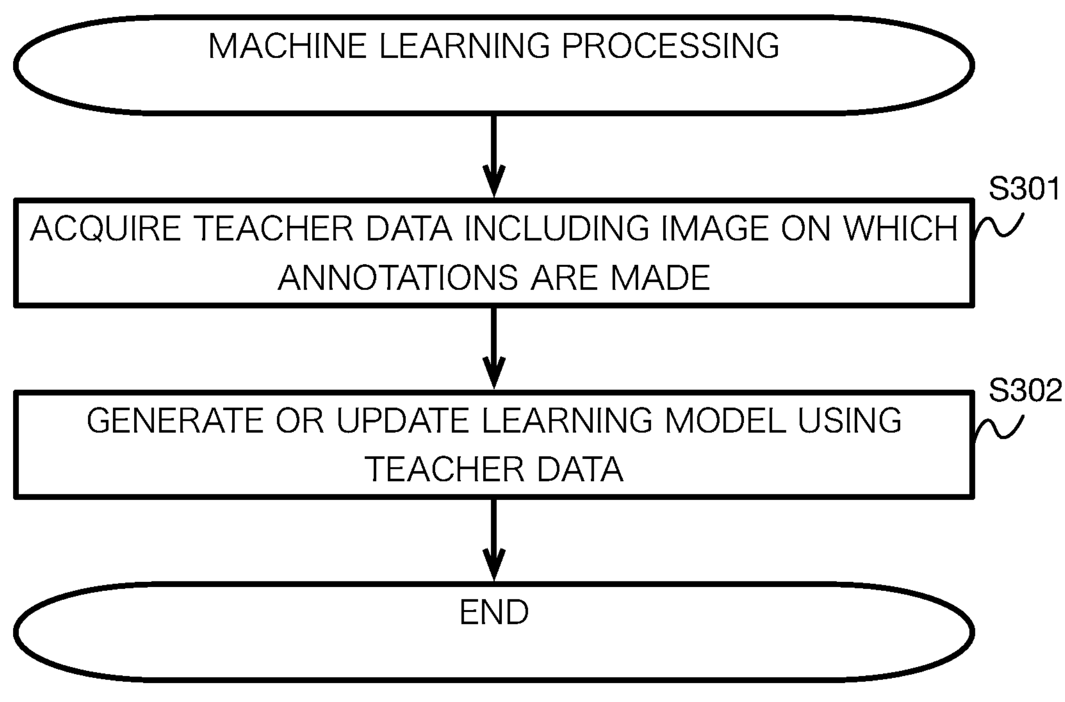
FIG. 8 is a flowchart showing the flow of machine learning processing according to the embodiment.

FIG. 8 is a flowchart showing the flow of the machine learning processing according to the present embodiment. The processing shown in this flowchart is performed when teacher data including an image on which annotations are made is prepared and instructions to perform machine learning are provided by a user.

In step S301, teacher data including an image on which annotations are made is acquired. The image acquisition unit 21 acquires as teacher data an image on which one or a plurality of annotations for showing a position at which a predetermined object (an antenna device in the present embodiment) in an image is shown are made. Note that the image acquired here on which the annotations are made is preferably an image that has been subjected to annotation correction by the annotation correction processing described with reference to FIG. 6 and/or an adjustment image generated by the data expansion processing described with reference to FIG. 7, but an image that has not been subjected to both the annotation correction and the parameter adjustment may be acquired. After that, the processing proceeds to step S302.

In step S302, a learning model is generated or updated. The machine learning unit 27 generates a learning model for detecting a predetermined object (an antenna device in the present embodiment) in an image or updates an existing learning model, by performing machine learning using the teacher data including the image acquired in step S301. After that, the processing shown in this flowchart ends.

Figure 9:
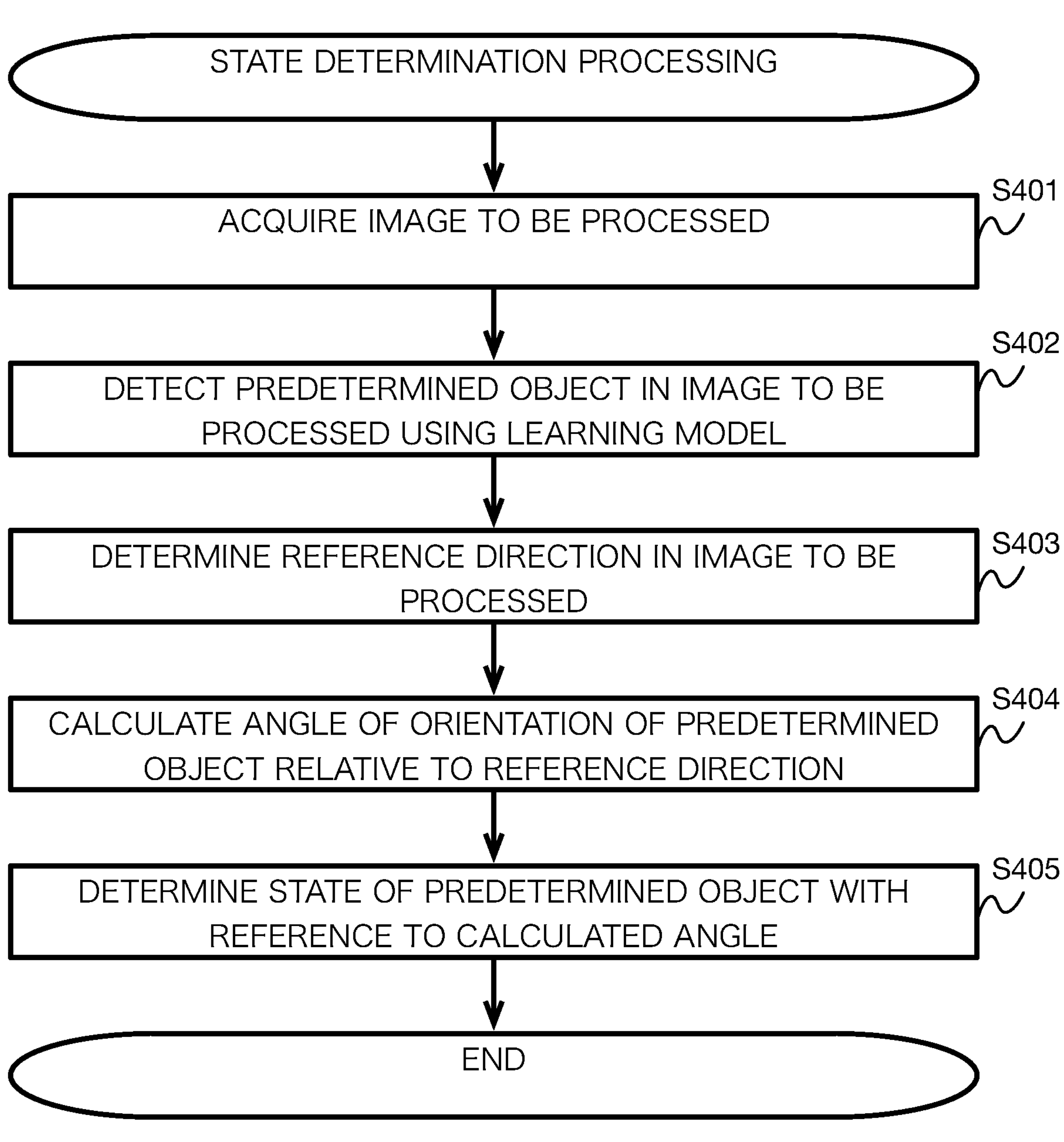
FIG. 9 is a flowchart showing the flow of state determination processing according to the embodiment.

FIG. 9 is a flowchart showing the flow of the state determination processing according to the present embodiment. The processing shown in this flowchart is performed when image data of an image to be processed is prepared and instructions to perform a state determination are provided by a user.

A user captures an image of an antenna device of a base station using the imaging device 81 of the drone 8 that is in flight and inputs image data of an obtained image to be processed to the information processing apparatus 1. On this occasion, the user may perform photographing so that a plurality of antenna devices are included in one image to be processed. When a plurality of antenna devices are included in one image to be processed, the state determination processing is performed for each of the regions of the antenna devices included in the image to be processed. An imaging method and a method for inputting image data to the information processing apparatus 1 are not limited. However, in the present embodiment, an image of an antenna device installed on a structure is captured using the drone 8 on which the imaging device 81 is mounted, and image data transferred from the imaging device 81 to the user terminal 9 via communication or a recording medium is further transferred to the information processing apparatus 1 via a network, whereby image data of an image to be processed is input to the information processing apparatus 1.

In steps S401 and S402, a predetermined object in an image to be processed is detected using a learning model. The processing object acquisition unit 28 acquires an image to be processed (an image aerially photographed using the imaging device 81 mounted on the drone 8 that is in flight in the present embodiment) (step S401). Then, the object detection unit 29 detects a predetermined object (an antenna device in the present embodiment) in the image to be processed acquired in step S401 using a learning model generated by the machine learning processing described with reference to FIG. 8 (step S402). After that, the processing proceeds to step S403.

In steps S403 and S404, the tilt of a detected object is calculated. The angle calculation unit 30 calculates the angle of the object detected in step S402 relative to a predetermined reference in the image to be processed.

Figure 10:
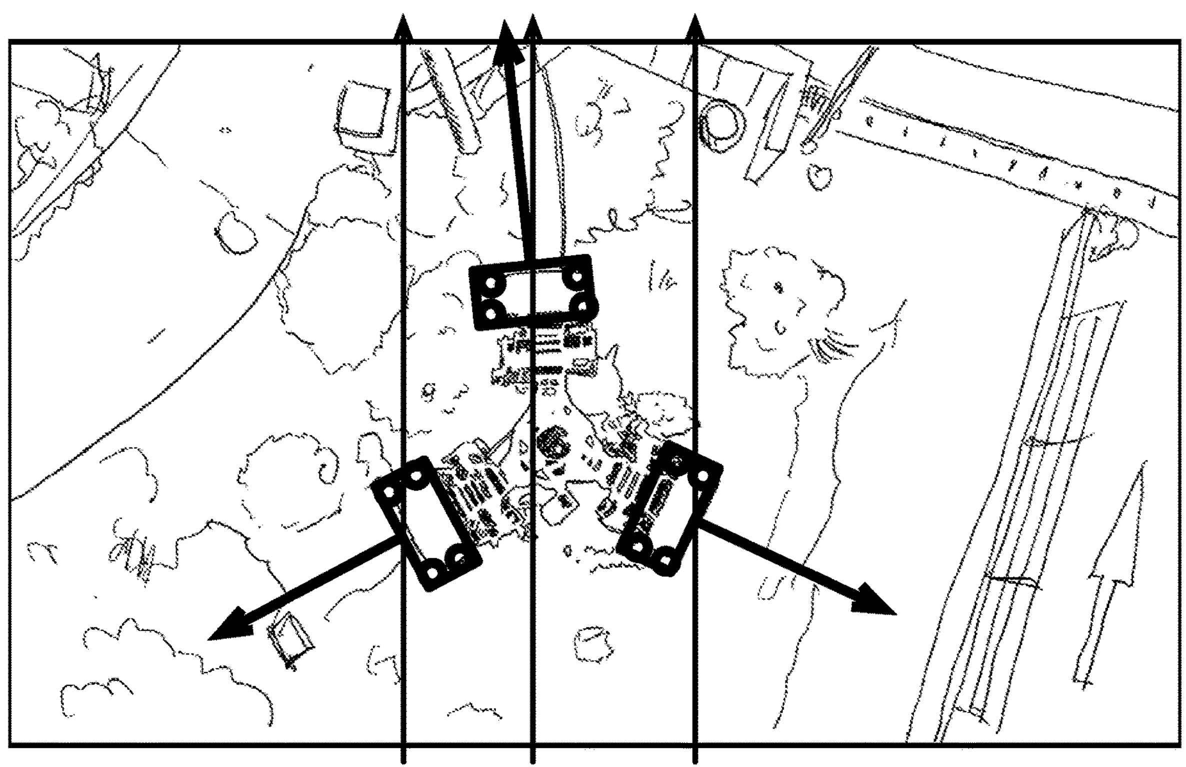
FIG. 10 is a diagram showing the outline of calculating an azimuth angle in a top view image to be processed in the embodiment.

FIG. 10 is a diagram showing the outline of calculating an azimuth angle in a top view image to be processed in the present embodiment. FIG. 10 shows the outline of a case in which the angle calculation unit 30 calculates the angle of the orientation of an antenna device (a predetermined object) detected from an image to be processed relative to a north direction (that may be a true north or a magnetic north) representing a predetermined reference. First, the angle calculation unit 30 determines a reference direction (here, a north direction) in an image to be processed (step S403). In the present embodiment, it is assumed that an image to be processed has been subjected to image correction in advance so as to make its immediately upward direction be a north direction and the immediately upward direction of the image is determined as a reference direction. However, a reference direction may be determined according to other methods. For example, when an image to be processed is not an image that has been subjected to image correction so as to make its immediate upward direction be a north direction, a method for referring to meta data (accelerations of respective axes, angular velocities of respective axes, positional information, compass direction, or the like) added to the image to be processed or a method for comparing the image to be processed with a map image may be employed to specify a north direction in an image and determine the north direction as a reference direction. Further, a direction other than a north direction may be employed as a reference direction. For example, the design-correct installation direction of a predetermined object (an antenna device in the present embodiment), the vertical direction, the horizontal direction, or the like may be employed as a reference direction.

Then, the angle calculation unit 30 determines the orientation of the detected antenna device (predetermined object) (step S404). Here, a method for determining the orientation of a predetermined object by the angle calculation unit 30 is not limited. However, for example, a method for estimating the orientation of an object by applying a box boundary having orientation to the object detected using a machine learning model (see NPL 1), a method for determining the front direction of a detected antenna device by reading a combination of the shape of the antenna device and the front direction of the antenna device in the shape, that are defined in advance, and applying the combination to the contour of the detected antenna device, or the like may be employed. Then, the angle calculation unit 30 calculates an angle formed by the determined reference direction and the determined front direction of the antenna device. In an example shown in FIG. 10, an angle formed by a reference direction shown by a thin line with an arrow and the front direction of an antenna device shown by a thick line with an arrow is calculated. Further, as described above, the design-correct installation direction of a predetermined object, the vertical direction, the horizontal direction, or the like may be employed as a reference direction, besides a compass direction.

Figure 11:
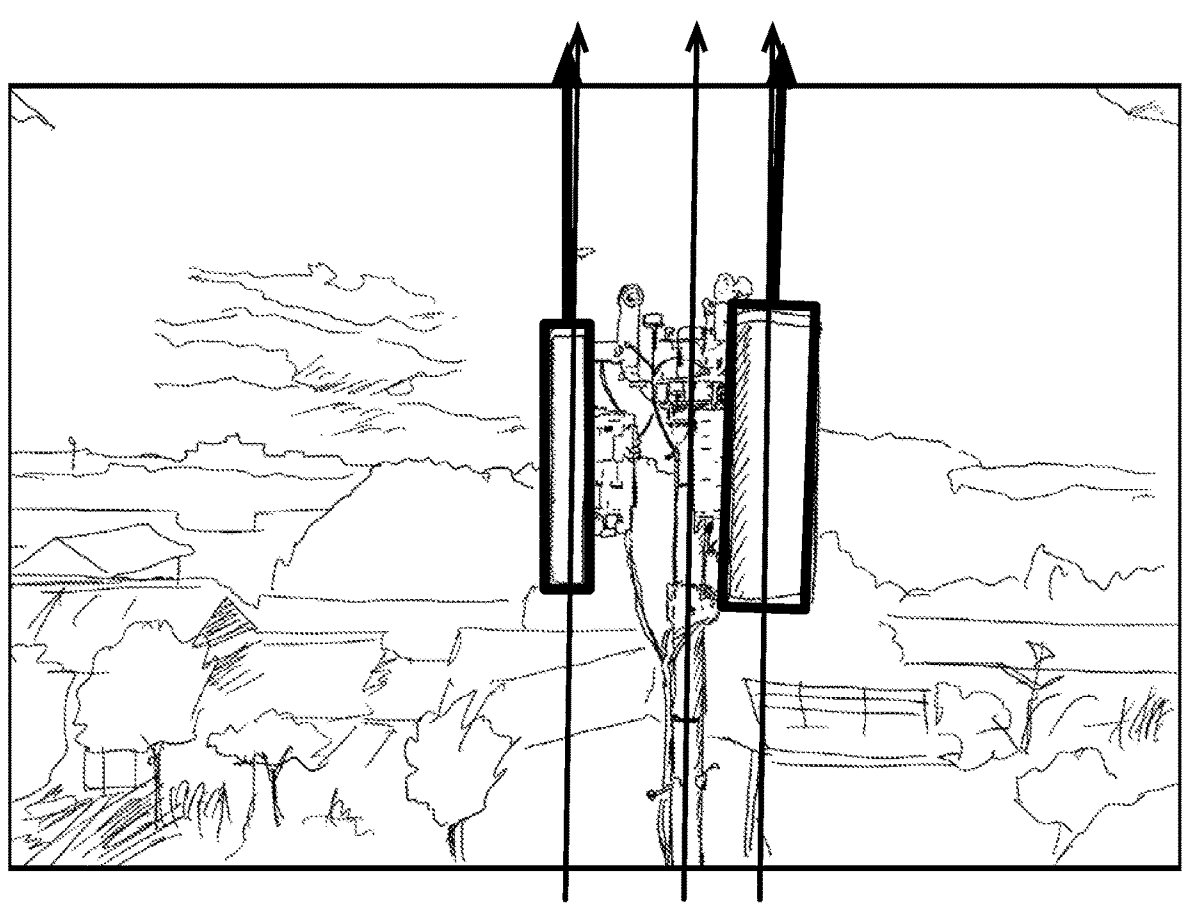
FIG. 11 is a diagram showing the outline of calculating the tilt in a side view image to be processed in the embodiment.

FIG. 11 is a diagram showing the outline of calculating the tilt in a side view image to be processed in the present embodiment. FIG. 11 shows the outline of a case in which the angle calculation unit 30 calculates the angle of the tilt of an antenna device (predetermined object) detected from an image to be processed relative to a vertical direction representing a predetermined reference. First, the angle calculation unit 30 determines a reference direction (here, a vertical direction) in an image to be processed (step S403). In the present embodiment, it is assumed that a center pole in the image is correctly installed in a vertical direction and the longitudinal direction of the center pole is determined as a reference direction. However, a reference direction may be determined according to other methods. For example, a method for referring to meta data (accelerations of respective axes, angular velocities of respective axes, or the like) added to the image to be processed may be employed to specify a vertical direction in the image and determine the vertical direction as a reference direction. In this manner, the angle calculation unit 30 can calculate the azimuth angle, the tilt, or the like of a prescribe object. After that, the processing proceeds to step S405.

In step S405, the state of a predetermined object is determined. In the present embodiment, the information processing apparatus 1 determines, by determining whether the angle calculated in step S404 falls within a previously-set predetermined range, whether the installation state of the antenna device is in a proper state. After that, the processing shown in this flowchart ends, and a determination result is output to the user.

According to the above state determination processing, it is possible to obtain the angle of a predetermined object relative to a reference direction and determine the state of the predetermined object (the installation state of an antenna device in the present embodiment) with reference to the obtained angle.

<Variations>

The above embodiments describe an example in which the annotation correction processing, the data expansion processing, the machine learning processing, and the state determination processing are performed by one information processing apparatus. However, each of these processing may be separated and performed by a separate information processing apparatus. Further, on this occasion, some of the image acquisition unit 21, the region specification unit 22, the edge detection unit 23, the estimation unit 24, the annotation correction unit 25, the adjustment image generation unit 26, the machine learning unit 27, the processing object acquisition unit 28, the object detection unit 29, and the angle calculation unit 30 provided in the information processing apparatus 1 may be omitted.

Figure 12:
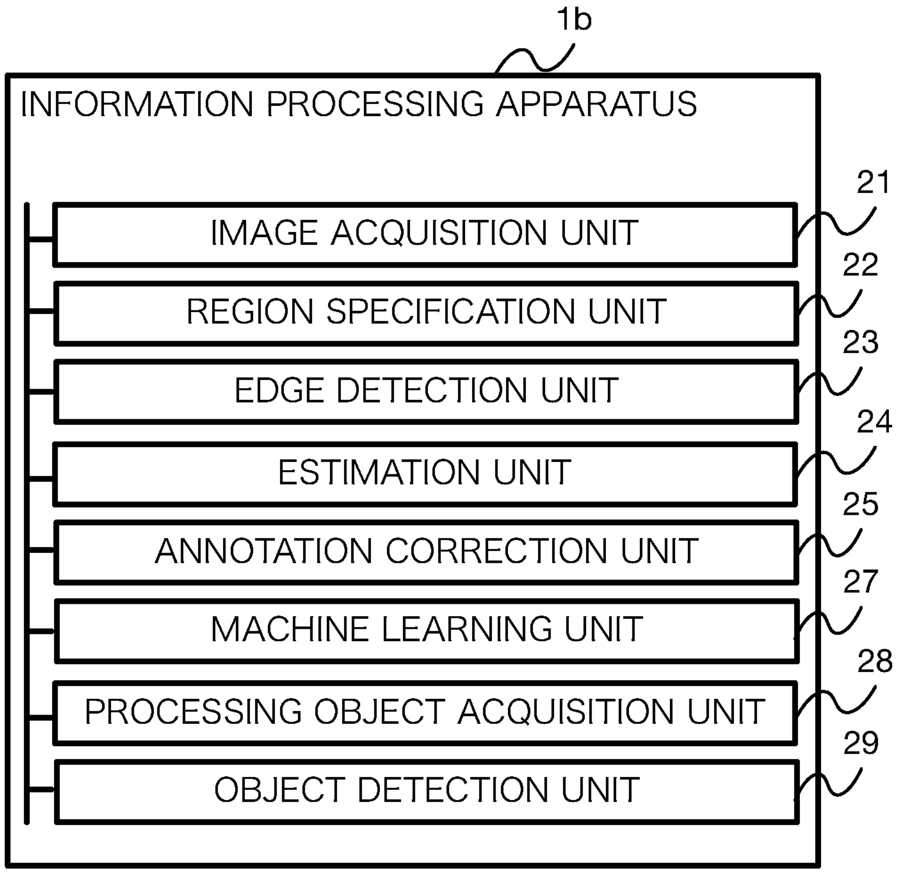
FIG. 12 is a diagram showing the outline of the functional configuration of an information processing apparatus according to a variation.

FIG. 12 is a diagram showing the outline of the functional configuration of an information processing apparatus 1*b* according to a variation. The information processing apparatus 1*b* functions as an information processing apparatus including an image acquisition unit 21, a region specification unit 22, an edge detection unit 23, an estimation unit 24, an annotation correction unit 25, a machine learning unit 27, a processing object acquisition unit 28, and an object detection unit 29. Since respective functions provided in the information processing apparatus 1*b* are substantially the same as those of the above embodiments except that the adjustment image generation unit 26 and the angle calculation unit 30 are omitted, their descriptions will be omitted.

Figure 13:
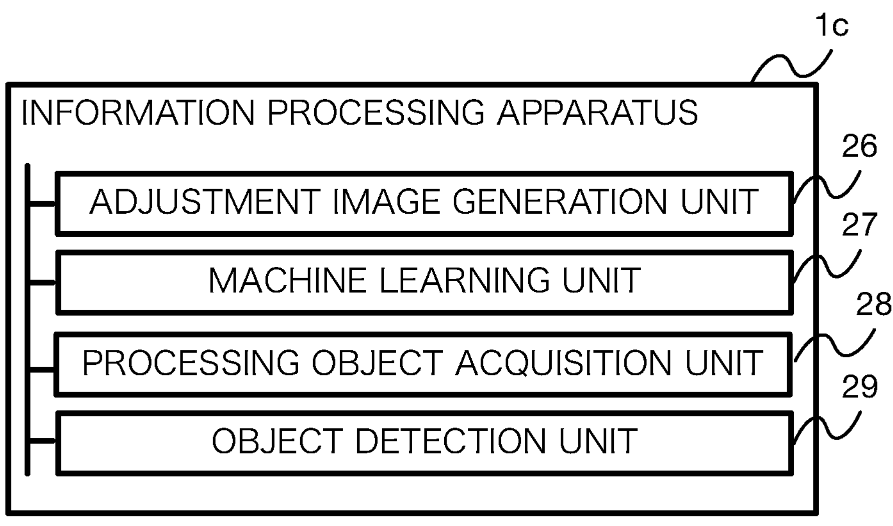
FIG. 13 is a diagram showing the outline of the functional configuration of an information processing apparatus according to a variation.

FIG. 13 is a diagram showing the outline of the functional configuration of an information processing apparatus 1*c* according to a variation. The information processing apparatus 1*c* functions as an information processing apparatus including an adjustment image generation unit 26, a machine learning unit 27, a processing object acquisition unit 28, and an object detection unit 29. Since respective functions provided in the information processing apparatus 1*c* are substantially the same as those of the above embodiments except that the image acquisition unit 21, the region specification unit 22, the edge detection unit 23, the estimation unit 24, the annotation correction unit 25, and the angle calculation unit 30 are omitted, their descriptions will be omitted.

Further, the above embodiments describe an example in which aerial photographing is performed using the drone 8. However, other apparatuses (such as an airplane) may be used for aerial photographing.

REFERENCE SIGNS LIST

1 Information processing apparatus

The invention claimed is:

1. An information processing apparatus comprising:

at least one memory configured to store program code;

at least one processor configured to operate as instructed by the program code, the program code including:

acquisition code configured to cause at least one of the at least one processor to acquire an image used as teacher data for machine learning, the image being annotated before the machine learning with one or a plurality of annotations for showing a position in the image at which a predetermined object is shown;

generation code configured to cause at least one of the at least one processor to generate an adjustment image in which parameters relating to the entire image are adjusted such that the pixels in which the predetermined object is imaged and the pixels in which the background of the predetermined object is imaged approximate each other in the parameters of the respective pixels, thereby making detection of the predetermined object difficult;

machine learning code configured to cause at least one of the at least one processor to generate a machine learning model for detecting the predetermined object in an image by executing machine learning using training data including an image and the adjustment image to which one or a plurality of annotations are attached; and region specification code configured to cause at least one of the at least one processor to specify a region in which one or a plurality of annotations satisfy a predetermined criterion.

2. The information processing apparatus according to claim 1, wherein the generation code is further configured to cause at least one of the at least one processor to generate the adjustment image adjusted so that pixels capturing the predetermined object and pixels capturing a background of the predetermined object become close to each other in parameters of the respective pixels.

3. The information processing apparatus according to claim 1, wherein the generation code is further configured to cause at least one of the at least one processor to generate the adjustment image in which at least a parameter relating to brightness of the image among the parameters of the image is adjusted.

4. The information processing apparatus according to claim 1, wherein the generation code is further configured to cause at least one of the at least one processor to generate a first adjustment image in which the parameters of the image are adjusted and a second adjustment image in which the parameters of the image are adjusted so as to be made different from the parameters of the first adjustment image, wherein the machine learning code is further configured to cause at least one of the at least one processor to perform machine learning using teacher data including the first adjustment image and the second adjustment image.

5. The information processing apparatus according to claim 1, wherein the program code further includes:

processing code configured to cause at least one of the at least one processor to acquire an image to be processed; and detection code configured to cause at least one of the at least one processor to detect, by using the machine learning model generated by the machine learning unit, the predetermined object in the image to be processed.

6. The information processing apparatus according to claim 5, wherein the program code further includes:

calculation code configured to cause at least one of the at least one processor to calculate an angle of a detected object relative to a predetermined reference in the image to be processed.

7. The information processing apparatus according to claim 6, wherein the calculation code is further configured to cause at least one of the at least one processor to calculate the angle of the detected object relative to any of a predetermined compass direction, a vertical direction, and a horizontal direction in the image to be processed.

8. An information processing apparatus comprising:

at least one memory configured to store program code;

at least one processor configured to operate as instructed by the program code, the program code including:

processing code configured to cause at least one of the at least one processor to acquire an image to be processed;

acquisition code configured to cause at least one of the at least one processor to acquire an image with one or a plurality of annotations for showing a position in the image at which a predetermined object is shown;

generation code configured to cause at least one of the at least one processor to generate an adjustment image in which parameters relating to the entire image are adjusted such that the pixels in which the predetermined object is imaged and the pixels in which the background of the predetermined object is imaged approximate each other in the parameters of the respective pixels, thereby making detection of the predetermined object difficult;

machine learning code configured to cause at least one of the at least one processor to generate a machine learning model for detecting the predetermined object in an image by executing machine learning using training data including an image and the adjustment image to which one or a plurality of annotations are attached;

detection code configured to cause at least one of the at least one processor to detect, by using the machine learning model, the predetermined object in the image to be processed;

calculation code configured to cause at least one of the at least one processor to calculate an angle of a detected object relative to a predetermined reference in the image to be processed; and region specification code configured to cause at least one of the at least one processor to specify a region in which one or a plurality of annotations satisfy a predetermined criterion.

9. The information processing apparatus according to claim 8, wherein the generation code is further configured to cause at least one of the at least one processor to generate the adjustment image in which the parameters of the image are adjusted to make the predetermined object hardly detected.

10. The information processing apparatus according to claim 9, wherein the generation code is further configured to cause at least one of the at least one processor to generate the adjustment image adjusted so that pixels capturing the predetermined object and pixels capturing a background of the predetermined object become close to each other in parameters of the respective pixels.

11. The information processing apparatus according to claim 9, wherein the generation code is further configured to cause at least one of the at least one processor to generate the adjustment image in which at least a parameter relating to brightness of the image among the parameters of the image is adjusted.

12. The information processing apparatus according to claim 9, wherein the generation code is further configured to cause at least one of the at least one processor to generate a first adjustment image in which the parameters of the image are adjusted and a second adjustment image in which the parameters of the image are adjusted so as to be made different from the parameters of the first adjustment image, and the machine learning code is further configured to cause at least one of the at least one processor to perform machine learning using teacher data including the first adjustment image and the second adjustment image.

13. The information processing apparatus according to claim 9, wherein the calculation code is further configured to cause at least one of the at least one processor to calculate the angle of the detected object relative to any of a predetermined compass direction, a vertical direction, and a horizontal direction in the image to be processed.

14. A method performed by a computer, the method comprising:

acquiring an image used as teacher data for machine learning, the image being annotated before the machine learning with one or a plurality of annotations for showing a position in the image at which a predetermined object is shown;

generating an adjustment image in which parameters relating to the entire image are adjusted such that the pixels in which the predetermined object is imaged and the pixels in which the background of the predetermined object is imaged approximate each other in the parameters of the respective pixels, thereby making detection of the predetermined object difficult;

generating a machine learning model for detecting the predetermined object in an image by executing machine learning using training data including an image and the adjustment image to which one or a plurality of annotations are attached; and specifying a region in which one or a plurality of annotations satisfy a predetermined criterion.

15. A method performed by a computer, the method comprising:

acquiring an image to be processed;

acquiring an image being annotated before the machine learning with one or a plurality of annotations for showing a position in the image at which a predetermined object is shown;

generating an adjustment image in which parameters relating to the entire image are adjusted such that the pixels in which the predetermined object is imaged and the pixels in which the background of the predetermined object is imaged approximate each other in the parameters of the respective pixels, thereby making detection of the predetermined object difficult;

generating a machine learning model for detecting the predetermined object in an image by executing machine learning using training data including an image and the adjustment image to which one or a plurality of annotations are attached;

detecting, by using the machine learning model, the predetermined object in the image to be processed;

calculating an angle of a detected object relative to a predetermined reference in the image to be processed; and specifying a region in which one or a plurality of annotations satisfy a predetermined criterion.

16. The information processing apparatus according to claim 1, wherein the program code further includes:

edge detection code configured to cause at least one of the at least one processor to perform edge detection in the specified region;

estimation code configured to cause at least one of the at least one processor to estimate, based on a detected edge, a position at which an annotation was intended to be made; and correction code configured to cause at least one of the at least one processor to correct the annotation by moving the position of the annotation to the estimated position so as to be along the detected edge, wherein the machine learning code is further configured to cause at least one of the at least one processor to generate the machine learning model using teacher data including the annotation-corrected image.

* * * * *